US007737834B2

(12) United States Patent
Kawase et al.

(10) Patent No.: US 7,737,834 B2
(45) Date of Patent: Jun. 15, 2010

(54) DATA COMMUNICATION SYSTEM (75) Inventors: Shinichi Kawase, Ogaki (JP); Youichi Okubo, Ogaki (JP); Yasuhisa Tsujita, Ogaki (JP); Syuji Aoyama, Kani (JP)

(73) Assignee: Pacific Industrial Co., Ltd., Ogaki-shi (JP)

( * ) Notice: Subject to any disclaimer, the term of this patent is extended or adjusted under 35 U.S.C. 154(b) by 1030 days.

(21) Appl. No.: 11/455,890

(22) Filed: Jun. 20, 2006

(65) Prior Publication Data

US 2007/0227240 A1 Oct. 4, 2007

(30) Foreign Application Priority Data

Mar. 31, 2006 (JP) .............................. 2006-097807

(51) Int. Cl.
B60Q 1/00 (2006.01)
(52) U.S. Cl. ....................................... 340/438; 340/445
(58) Field of Classification Search ................. 340/438, 340/439, 440, 441, 442, 443, 444, 445, 449, 340/450, 457
See application file for complete search history.

(56) References Cited

U.S. PATENT DOCUMENTS 3,895,347 A 7/1975 Takusagawa et al.
5,959,365 A * 9/1999 Mantini et al. ............. 307/10.1
6,992,565 B1 1/2006 Giesler
2006/0063488 A1 3/2006 Hraby et al.

FOREIGN PATENT DOCUMENTS

| GB | 2 122 757 A | 1/1984 |
| JP | A 2001-16281 | 1/2001 |
| JP | A 2005-119370 | 5/2005 |
| WO | WO 2004/045875 A | 6/2004 |

* cited by examiner

Primary Examiner—Travis R Hunnings
(74) Attorney, Agent, or Firm—Oliff & Berridge PLC (57) ABSTRACT A data communication system installed in an electric machine includes a transmission terminal and a reception terminal both mounted on the electric machine, a transmission-side opposed conductive member disposed on the transmission terminal, a transmission circuit for applying voltage between the transmission-side conductive member and the conductive body, thereby changing electric field generated on the entire surface of the conductive body, the voltage being changed according to information to be transmitted, a reception-side opposed conductive member provided on the reception terminal, thereby being capable of generating potential difference according to the electric field between the conductive body and the reception-side opposed conductive member, and a reception circuit for receiving the information based on a change in the potential difference between the conductive body and the reception-side opposed conductive member.

10 Claims, 10 Drawing Sheets

DATA COMMUNICATION SYSTEM

BACKGROUND OF THE INVENTION

1. Field of the Invention

The present invention relates to a data communication system installed in an electric machine such as automobile, airplane each including an electrically conductive body insulated from the ground, the system transmitting and receiving information between two different locations in the electric machine.

2. Description of the Related Art

One of conventional data communication systems of the aforesaid type comprises a plurality of communication terminals disposed at a plurality of locations in a vehicle body so that the communication terminals are connected to each other by a transmission path. Each communication terminal converts information to electric signals, thereby transmitting and receiving the electric signals. For example, JP-A-2001-16281 discloses such a communication system.

Another conventional data communication system comprises a tire pressure detector mounted on a wheel and tire monitor device installed on a vehicle body. Information about inner pressure of a tire is transmitted and received by radio between the tire pressure detector and the tire monitor device. For example, JP-A-2005-119370 discloses such a communication system.

However, arrangement of the transmission path is difficult in the data communication system including the communication terminals connected to each other by the transmission path. As a result, installation of the system in the vehicle is troublesome. On the other hand, the conventional data communication system carrying out wireless communication by radio waves can easily be installed in a vehicle. However, there are problems of large power consumption and possibility of producing radio interference with other vehicles.

SUMMARY OF THE INVENTION

Therefore, an object of the present invention is to provide a data communication system which can easily be installed in the electric machine, reduce power consumption and suppress radio interference.

The present invention provides a data communication system installed in an electric machine including an electrically conductive body insulated from the ground and having a surface, the system transmitting and receiving information between two different locations in the electric machine. The system comprises a transmission terminal and a reception terminal both mounted on the electric machine, a transmission-side opposed conductive member provided on the transmission terminal so as to be opposed to the conductive body, a transmission circuit provided on the transmission terminal for applying voltage between the transmission-side opposed conductive member and the conductive body, thereby changing electric field generated on the entire surface of the conductive body, said voltage being changed according to information to be transmitted, a reception-side opposed conductive member provided on the reception terminal so as to be opposed to the conductive body, thereby being capable of generating potential difference according to the electric field between the conductive body and the reception-side opposed conductive member, and a reception circuit provided on the reception terminal for receiving the information based on a change in the potential difference between the conductive body and the reception-side opposed conductive member.

In the above-described arrangement, the conductive body but not radio waves is used as the transmission path. Data communication is carried out between the transmission and reception terminals located at the two locations which are away from each other on the conductive body. Consequently, radio interference can be suppressed and power consumption can be reduced. Furthermore, since no emission of radio waves into the air is necessary, data communication can be realized at a lower frequency. Furthermore, since no transmission path is necessary, troublesome arrangement of the path can be eliminated and the data communication system can easily be installed in the electric machine.

Furthermore, since data communication is possible by using a signal of lower frequency as described above, communication by base band system can be realized. For this purpose, the transmission circuit is configured so as to process information as digital signals and switches voltage to be applied between the transmission-side opposed conductive member and the conductive body between high and low levels according to a binary voltage of the digital signal. The reception circuit is configured so as to receive as digital signals the change in potential difference between the conductive body and the reception-side opposed conductive member.

Furthermore, the transmission circuit is provided with a modulation circuit for modulating a carrier wave according to the information, thereby applying amplitude voltage of the carrier wave between the transmission-side opposed conductive member and the conductive body. The reception circuit is provided with a demodulation circuit for obtaining as a carrier wave a change in potential difference between the conductive body and the reception-side opposed conductive member and demodulating the carrier wave, thereby obtaining information. Thus, data communication accompanying modulation and demodulation of carrier waves can be performed. Furthermore, when a plurality of transmission/reception terminals are provided each for serving both as the transmission terminal and as the reception terminal, data can be transmitted bidirectionally among the plurality of transmission/reception terminals.

An amount of current flowing between the conductive body and the reception-side opposed conductive member can be suppressed when the reception circuit includes a voltage follower circuit into which the potential difference between the conductive body and the reception-side opposed conductive member is input. Consequently, information can be obtained from the electric field without reduction in the potential difference caused by the electric field.

In one embodiment, the transmission circuit applies voltage to the transmission-side opposed conductive member with conductive body serving as an electrical ground to generate an electric field between the transmission-side opposed conductive member and the conductive body. Alternatively, the transmission circuit applies voltage to the conductive body with the transmission-side opposed conductive member serving as an electrical ground to generate an electric field between the transmission-side opposed conductive member and the conductive body.

Furthermore, the reception circuit may pick up an electric field between the reception-side opposed conductive member and the conductive body with the conductive body serving as an electrical ground. Alternatively, the reception circuit may pick up an electric field between the reception-side opposed conductive member and the conductive body with the reception-side opposed conductive member serving as an electrical ground.

Furthermore, the electric machine is a vehicle and when the conductive body is a vehicle-constituting conductor including a chassis, main body, axle shafts and tire wheels and insulated from the ground by the tire, data communication can be realized between two locations in the vehicle. Furthermore, an in-vehicle local area network (LAN) can be realized in which a plurality of transmission terminals and a plurality of reception terminals are provided and the conductive body serves as a bus line.

In another embodiment, the transmission terminal is a tire pressure detector which is mounted on the tire wheel for detecting an internal pressure of the tire, thereby transmitting a result of detection. The transmission-side opposed conductive member is mounted on the transmission terminal so as to be opposed to the tire wheel. The reception terminal is a tire monitor device mounted on the main body for receiving the result of detection of tire internal pressure. The reception-side opposed conductive member is provided on the reception terminal so as to be opposed to the main body. Consequently, information about tire internal pressure can be transmitted and received between the vehicle main body and each wheel.

BRIEF DESCRIPTION OF THE DRAWINGS

Other objects, features and advantages of the present invention will become clear upon reviewing the following description of the embodiment, with reference to the accompanying drawings, in which.

DETAILED DESCRIPTION OF THE INVENTION

Figure 1:
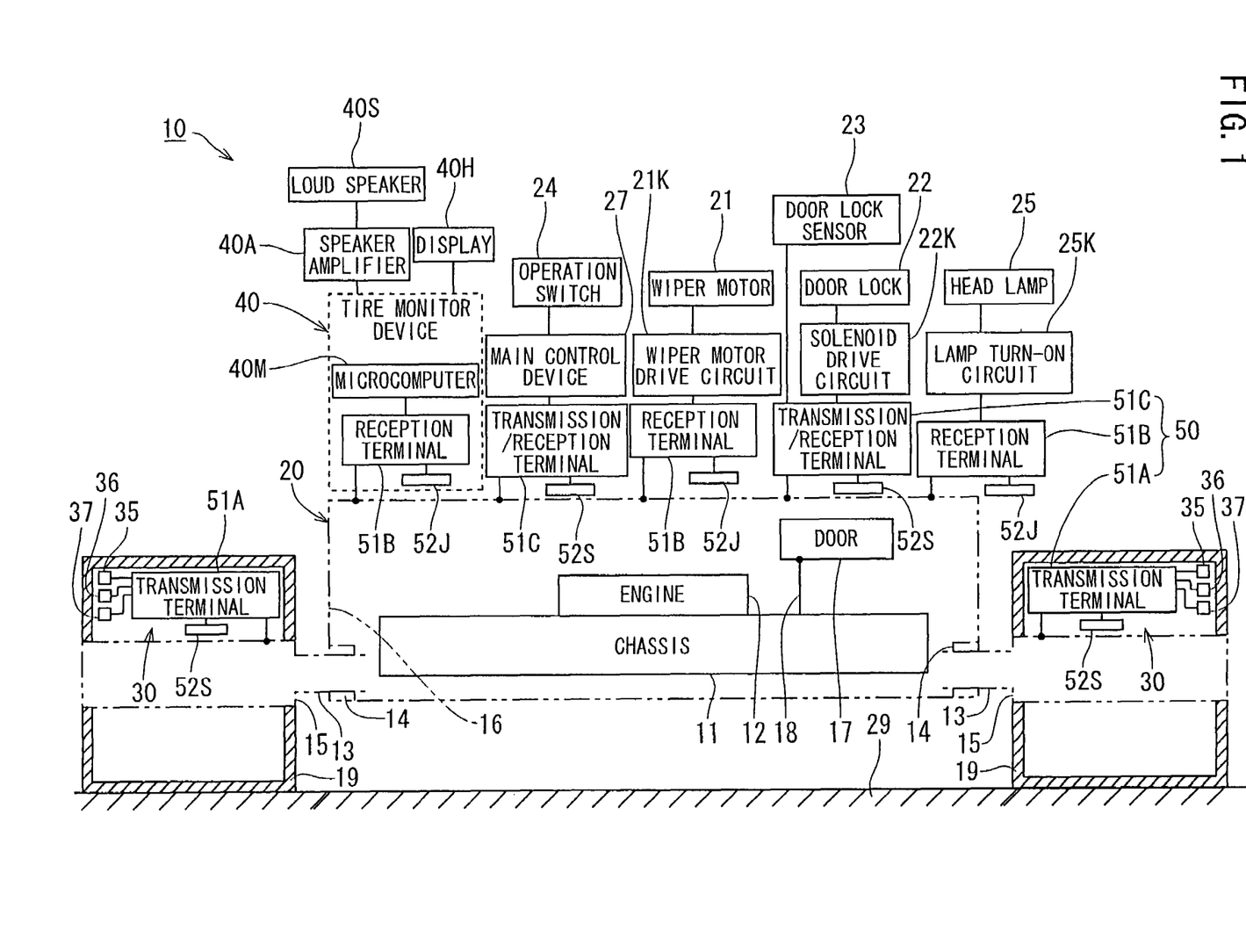
FIG. 1 is a block diagram of a data communication system in accordance with a first embodiment of the present invention.

An embodiment of the present invention will be described with reference to FIGS. 1 to 8. The data communication system of the embodiment is installed in a vehicle. Referring to FIG. 1, a vehicle 10 comprises a chassis 11, an engine 12, axles 13 (two axles being shown), bearings 14 (two bearings being shown) supporting the respective axles 13, tire wheels 15 fixed to distal ends of the respective axles 13, and a main body 16 fixed to the chassis 11, for example. All the components from the chassis 11 to the main body 16 described above which are electrically conductive constitute a vehicle-constituting conductor 20 (also corresponding to "a conductive body" in the invention). Furthermore, doors 17 are rotatably mounted on the main body 16. Each door 17 is conductively connected to the main body 16 by a cable 18 disposed at the rotation center side. Thus, each door 17 also constitutes the vehicle-constituting conductor 20. Tires 19 (two tires being shown) are mounted on the tire wheels 15 respectively. The vehicle-constituting conductor 20 is insulated by each tire 19 from the ground 29.

The vehicle 10 includes an active component which is activated by being supplied with electric power and a passive component which delivers an electrical signal according to a predetermined condition. The active component includes a wiper motor 21, head lamps 25, door lock 22, etc. The passive component includes a door lock sensor 23, operation switch 24, tire pressure detector 30, etc. A tire monitor device 40 and a main control device 27 obtain detection signals from the passive components to carry out predetermined processes, and the main control device 27 delivers predetermined control signals to operate the active components.

Figure 2:
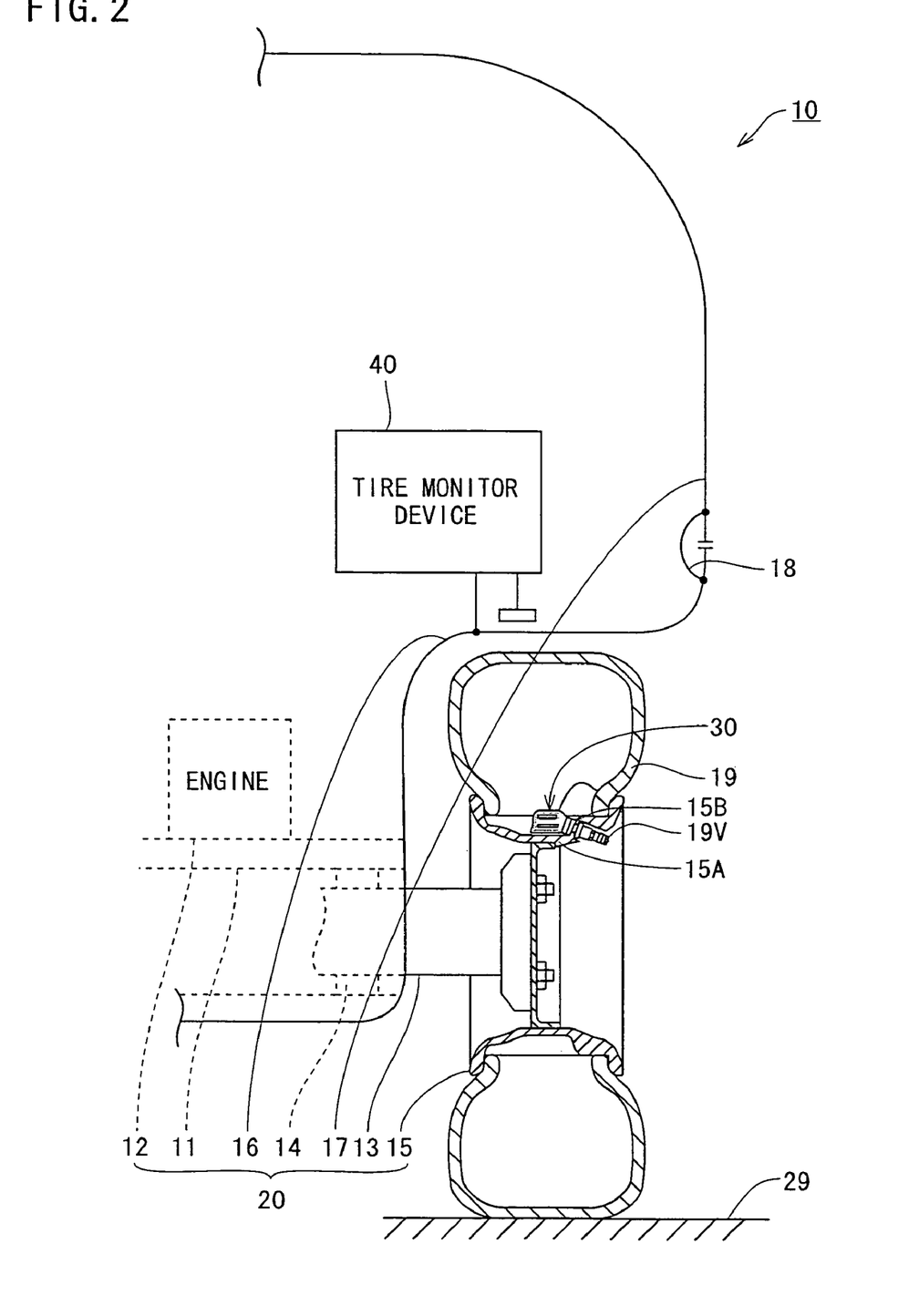
FIG. 2 is a conceptual illustration of a vehicle provided with the data communication system.
Figure 3:
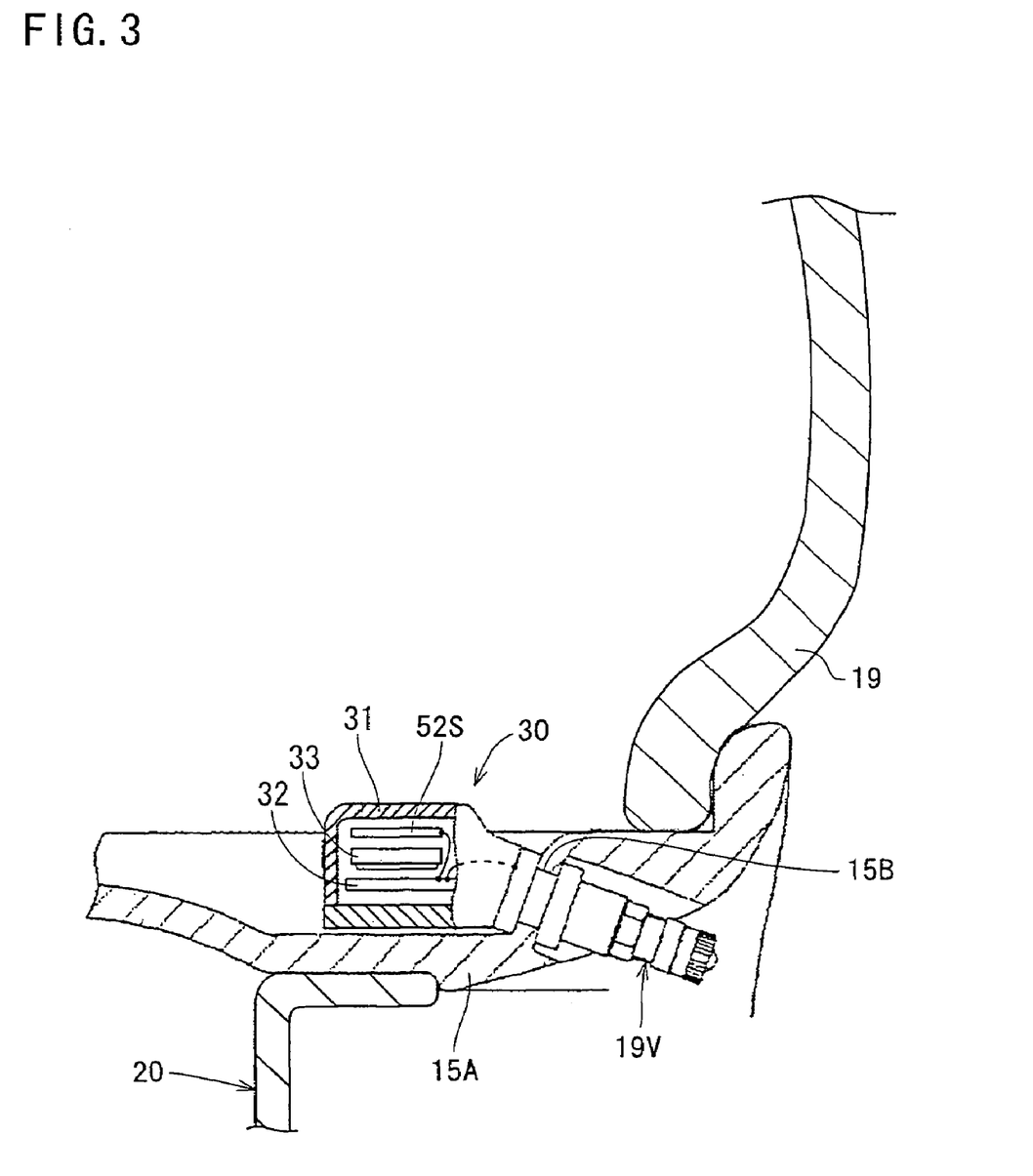
FIG. 3 is a sectional view of a tire and a tire pressure detector.
Figure 4:
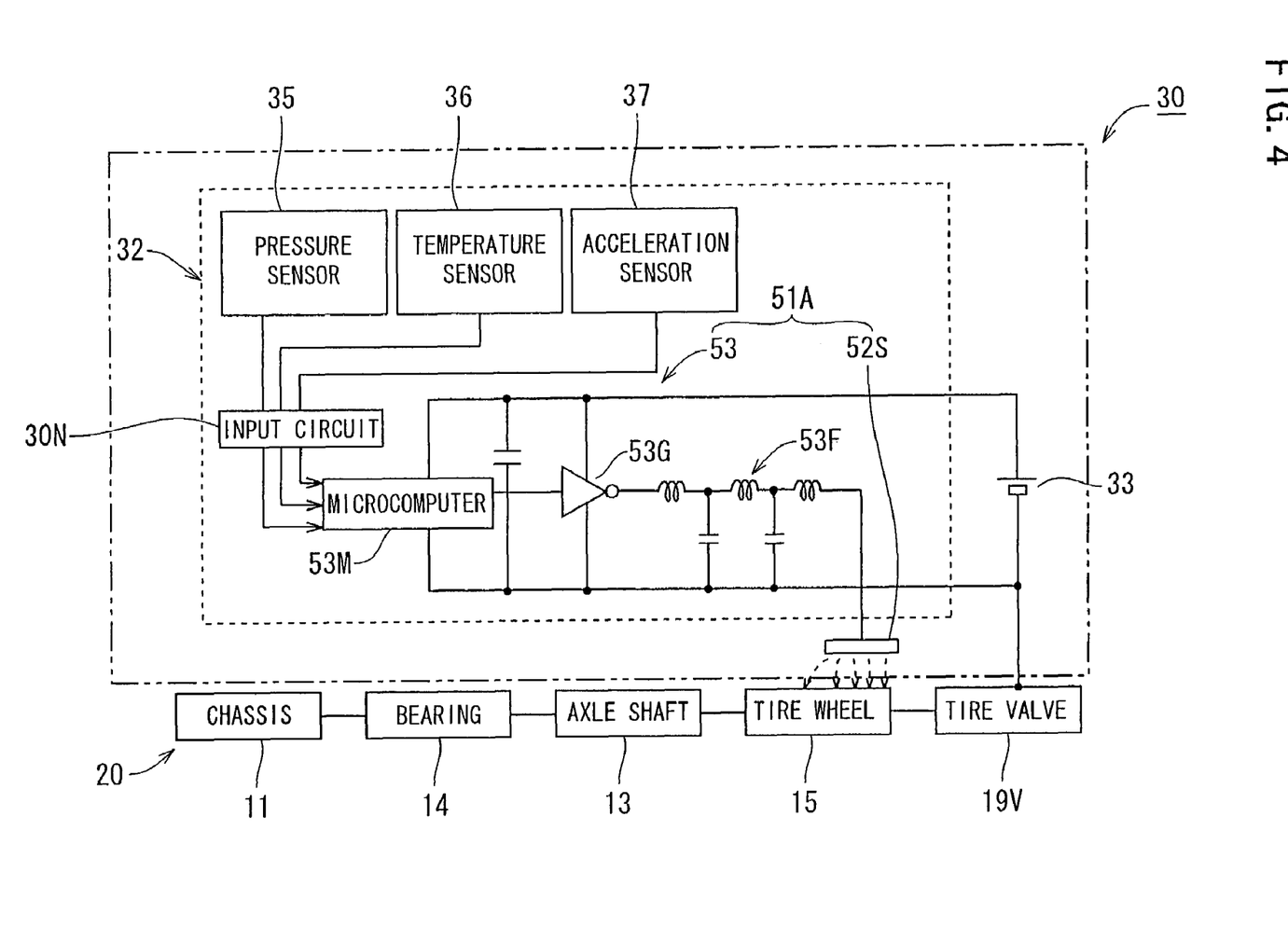
FIG. 4 is an electrical circuit diagram of the tire pressure detector.

The tire pressure detector 30 and the tire monitor device 40 will be described in detail. Referring to FIG. 2, the tire wheel 15 includes a rim 15A formed with a valve mount hole 15B. A tire valve 19V is fixed in the valve mount hole 15B. The tire valve 19V includes a proximal end disposed in the tire 19. The tire pressure detector 30 is fixed to the proximal end of the tire valve 19V. As shown in FIG. 3, the tire pressure detector 30 includes a case 31 fixed to the tire valve 19V and accommodating a circuit board 32 and a button cell battery 33. On the circuit board 32 are mounted a pressure sensor 35, a temperature sensor 36, an acceleration sensor together with a transmission circuit 53 of the present invention, as shown in FIG. 4. Furthermore, the case 31 further accommodates a transmission-side opposed conductive member 52S of the invention. The transmission circuit 53 and the transmission-side opposed conductive member 52S constitute a transmission terminal 51A. More specifically, the tire pressure detector 30 of the embodiment incorporates a transmission terminal 51A.

The transmission-side opposed conductive member 52S is formed into an about 2×3 cm rectangular plate and disposed at a position spaced about 1 cm from an inner surface of the rim 15A of the tire wheel 15 while being accommodated in the case 31, for example.

The transmission circuit 53 includes a microcomputer 53M (more specifically, one-chip microcomputer) having an output, and a NOT gate 53G and a lowpass filter 53F both of which are connected to the output of the microcomputer 53M. Furthermore, the transmission-side opposed conductive member 52S is connected via the NOT gate 53G and the lowpass filter 53F to the output of the microcomputer 53M. Additionally, the button cell battery 33 supplies electric power to the transmission circuit 53, so that the microcomputer 53M, the NOT gate 53G and a ground (GND) terminal of the lowpass filter 53F along with the negative pole of the button cell battery 33 are conductively connected via the tire valve 19V to the tire wheel 15 serving as the vehicle-constituting conductor 20.

Each of the microcomputer 53M and the NOT gate 53G comprises a complementary metal oxide semiconductor (CMOS). A binary of digital signals processed by each of the microcomputer 53M and the NOT gate 53G is at a high level, 3 V for example or a low level, 0 V for example. The microcomputer 53M includes an output terminal connected to the NOT gate 53G and a ground (GND) terminal conductively connected to the vehicle-constituting conductor 20 (more specifically, the tire wheel 15). The microcomputer 53M switches voltage between the output and GND terminals so that the voltage is either at a high level (3 V, for example) or a low level (0 V, for example), thereby delivering a digital signal. The NOT gate 53G reverses the logic state of the digital signal, applying the voltage between the transmission-side opposed conductive member 52S and the vehicle-constituting conductor 20 via the lowpass filter 53F. Thus, the transmission circuit 53 delivers the digital signal processed by the microcomputer 53M between the conductive member 52S and the conductor 20 without modulation.

A digital signal can generally contain high-frequency components during reverse between the high and low levels. The high-frequency components are normally radiated from the transmission-side opposed conductive member 52S into the air, whereupon unnecessary power consumption is forced. The aforesaid lowpass filter 53F serves to eliminate the high-frequency components to limit to the effect of voltage application by only lower frequency components (no current flowing), thereby suppressing power consumption.

The microcomputer 53M has an input to which the pressure sensor 35, temperature sensor 36 and acceleration sensor 37 are connected via an input circuit 30N including an analog/digital (A/D) converter. When the acceleration sensor 37 detects centrifugal force produced by revolution of the wheel 13, the microcomputer 53M carries out a predetermined program to take in results of detection by the pressure sensor 35 and the temperature sensor 36. The microcomputer 53M then delivers identification data set for every pressure detector 30 of the four tires 19 and information about identification data of the tire monitor device 40 serving as a recipient along with information about the detection results of the tire pressure and temperature. The voltage to be applied between the transmission-side opposed conductive member 52S and the vehicle-constituting conductor 20 is switched between the high and low levels according to the delivered information as described above.

Figure 5:
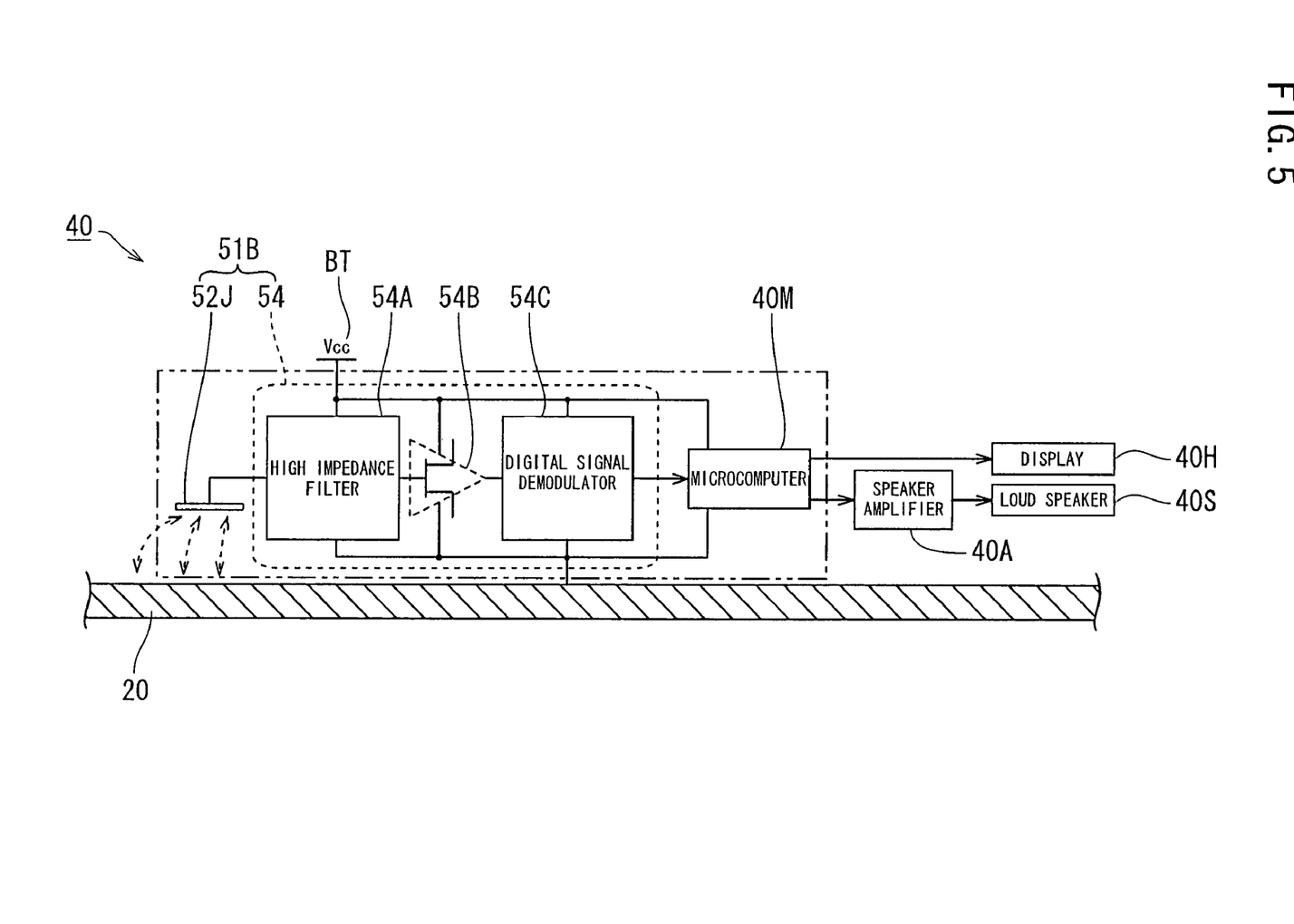
FIG. 5 is an electrical circuit diagram of a tire monitor device.

Referring now to FIG. 1, the tire monitor device 40 comprises a reception terminal 51B and a microcomputer 40M and is mounted on a part of the main body 16 composing the vehicle-constituting conductor 20. The part is covered by a dashboard (not shown), for example. The reception terminal 51B includes a reception-side opposed conductive member 52J and reception circuit 54 as shown in FIG. 5. The reception-side opposed conductive member 52J is formed into an about 2×3 cm rectangular plate and disposed at a position spaced about 1 cm from the main body 16 serving as the vehicle-constituting conductor 20 in the same manner as the above-described transmission-side opposed conductive member 52S. Furthermore, the reception-side opposed conductive member 52J and the main body 16 are kept opposed to each other with a space or insulator being interposed therebetween. As a result, when electric field is generated so as to cover an entire surface of the conductor 20, a potential difference occurs between the conductive member 52J and the conductor 20 in the electric field.

The reception circuit 54 includes a high impedance filter 54A, a buffer circuit 54B and a digital signal demodulator 54C. The high impedance filter 54A, buffer circuit 54B and digital signal demodulator 54C are connected in parallel between the positive pole of a battery BT of the vehicle 10 and the vehicle-constituting conductor 20 and supplied with electric power. The negative pole of the battery BT is connected to the conductor 20.

Figure 6:
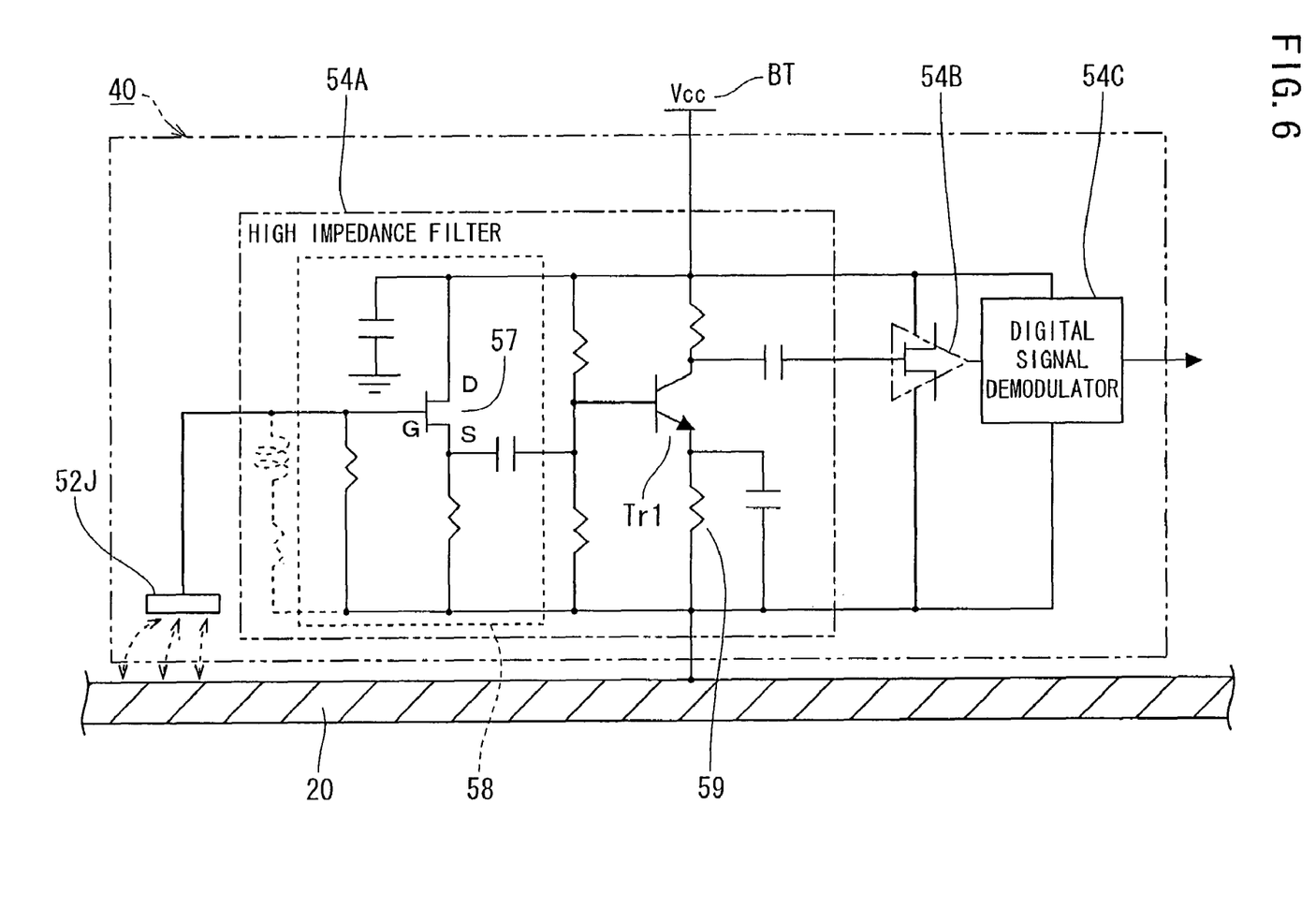
FIG. 6 is another electrical circuit diagram of the tire monitor device.

The high impedance filter 54A includes a voltage follower circuit 58 provided at the input side thereof as shown in FIG. 6. The voltage follower circuit 58 is a source follower circuit of a junction field effect transistor (FET) 57 (hereinafter, FET 57). The vehicle-constituting conductor 20 is connected to the source of FET 57. The reception-side opposed conductive member 52J is connected to the gate of FET 57. Thus, the potential difference between the reception-side opposed conductive member 52J and the vehicle-constituting conductor 20 is input into the voltage follower circuit 58. As the result of provision of the voltage follower circuit 58, an input impedance of the reception circuit 58 is increased, and accordingly, the current able to flow between the conductive member 52J and the conductor 20 is significantly small even if a potential difference occurs between the conductive member 52J and the conductor 20. Consequently, information can be obtained from the electric field without reduction in the potential difference produced by the electric field.

Output of the voltage follower circuit 58 is amplified by an amplifier circuit 59 to be supplied via the buffer circuit 54B into the digital signal demodulator 54C. The digital signal demodulator 54C determines whether output of the buffer circuit 54B corresponds with a first or second reference level within a predetermined error range, thereby generating a binary digital signal. Furthermore, the digital signal demodulator 54C incorporates a microcomputer (not shown) therein and carries out a process according to the information contained in the signal supplied from the buffer circuit 54B.

In response to a digital signal delivered from the digital signal demodulator 54C, the microcomputer 40M (see FIG. 5) of the tire monitor device 40 makes a display 40H display a predetermined image or message or controls a speaker amplifier 40A to drive a loud speaker 40S, thereby producing sound, for example.

Referring now to FIG. 1, to active components such as the main control device 27 and wiper motor 21 or to passive components such as the door lock sensor 23 are connected the aforesaid transmission terminal 51A, the reception terminal 51B, or a transmission/reception terminal 51C comprising the components of both transmission and reception terminals 51A and 51B. These terminals 51A, 51B and 51C constitute a data communication system 50 in the invention.

Figure 7:
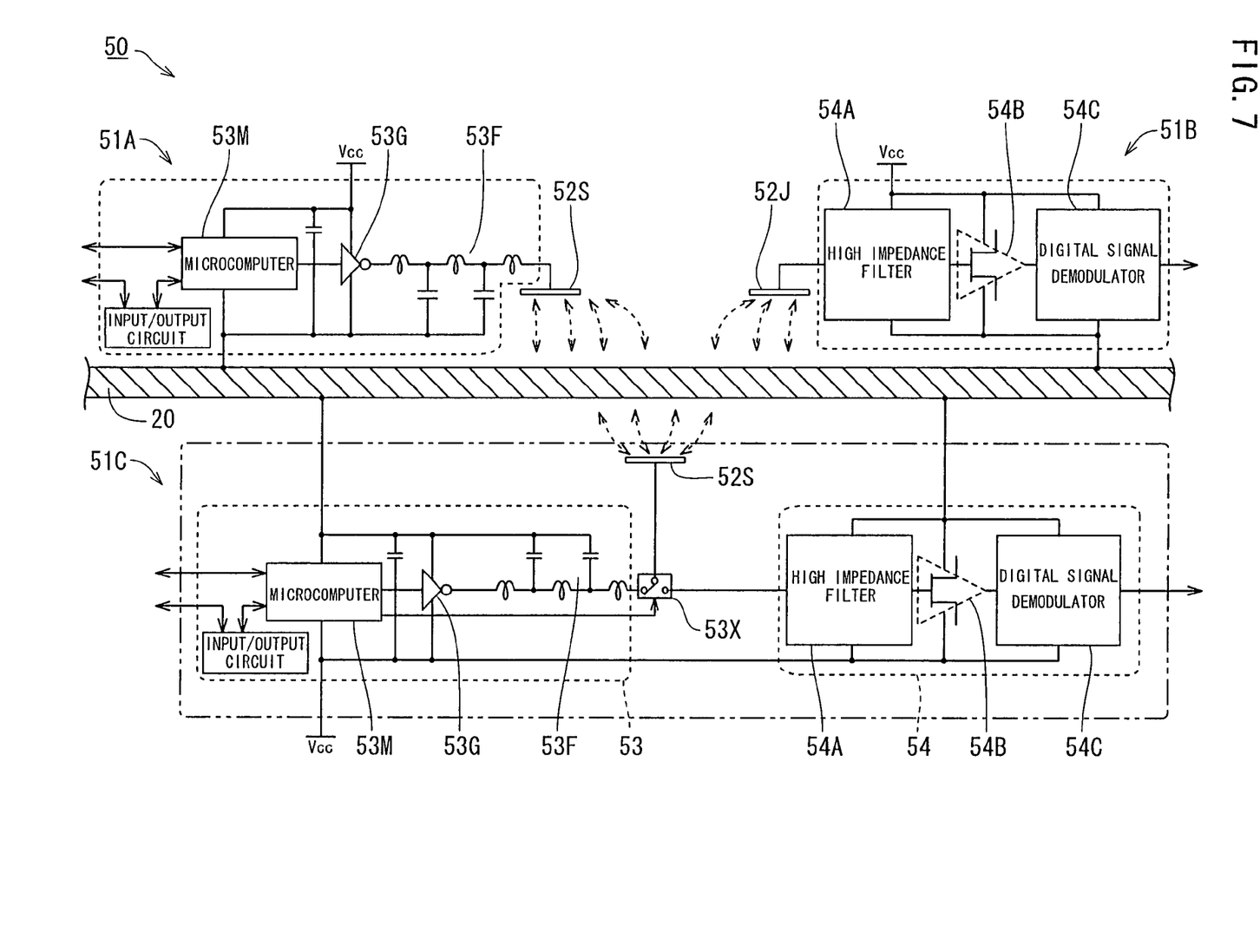
FIG. 7 is an electrical circuit diagram of the data communication system.

More specifically, the transmission/reception terminal 51C includes a transmission circuit 53 and a reception circuit 54 as shown in FIG. 7. The transmission-side opposed conductive member 52S is connected in common to the output of the transmission circuit 53 and the input of the reception circuit 54. Thus, the conductive member 52S serves as the reception-side opposed conductive member 52J. Furthermore, a switch 53X is provided between the transmission-side opposed conductive member 52S and a common node of the transmission and reception circuits 53 and 54. When the transmission circuit 53 carries out transmission, the microcomputer 53M opens the switch 53X. The microcomputer 53M closes the switch 53X when the transmission circuit 53 stops transmission.

As shown in FIG. 1, the transmission/reception terminal 51C is connected to the main control device 27. The reception terminal 51B is connected via a wiper motor drive circuit 21K to the wiper motor 21. The reception terminal 51B is connected via a lamp turn-on circuit 25K to the head lamp 25. The transmission/reception terminal 51C is connected via a solenoid drive circuit 22K to the door lock 22. A door lock sensor 23 is directly connected to the transmission/reception terminal 51C. More specifically, for example, the main control device 27 is directly connected to the microcomputer 53M of the transmission/reception terminal 51C. The door lock sensor 23 is indirectly connected to the microcomputer 53M through an input/output circuit of the transmission/reception terminal 51C. The wiper motor drive circuit 21K, the solenoid drive circuit 22K and the lamp turn-on circuit 25K are directly connected to the digital signal demodulators 54C of the reception terminals 51B respectively.

Figure 8:
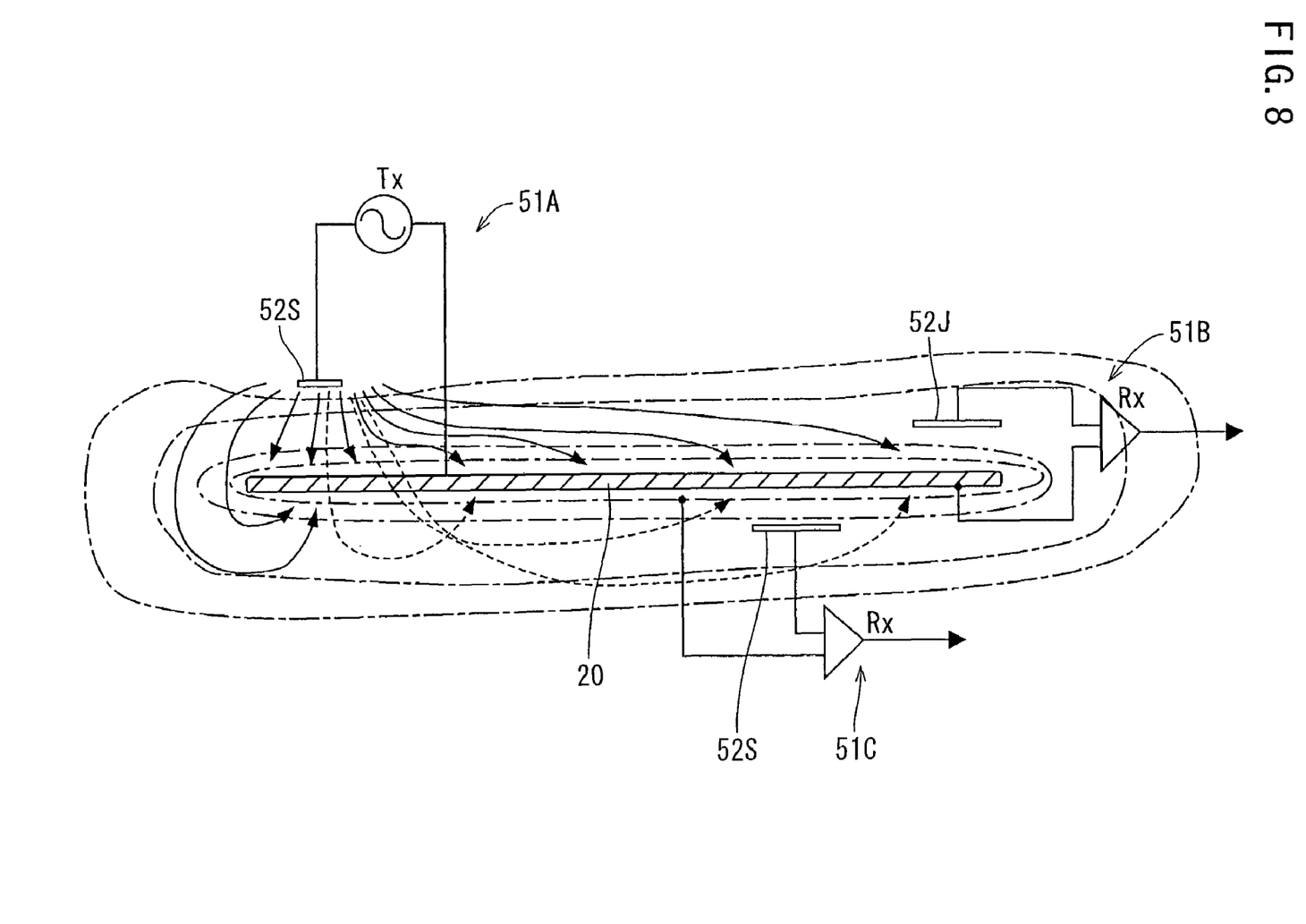
FIG. 8 is a conceptual illustration of the data communication system.

The following describes the operation of the data communication system and advantages achieved from the system. Upon run of the vehicle 10, the tire pressure detectors 30 of the four tires 19 are subjected to a centrifugal force. The acceleration sensor 37 of each tire pressure detector 30 detects the centrifugal force. Each tire pressure detector 30 transmits information including detection results of tire pressure and tire temperature, self-identification data, and identification data of tire monitor device 40 as a recipient. The microcomputer 53M of each tire pressure detector 30 delivers a digital signal containing results of detection of the tire pressure and tire temperature and identification data. Voltage according to the digital signal is applied between the transmission-side opposed conductive member 52S and each tire wheel 15. As a result, an electric field is generated over an entire surface of the vehicle-constituting conductor 20 including the tire wheel 15. The reception-side opposed conductive member 52J of the tire monitor device 40 located away from the tire wheel 15 is subjected to the electric field, whereupon a potential difference according to the electric field occurs between the reception-side opposed conductive member 52J and the vehicle-constituting conductor 20. Furthermore, potential differences occur between the conductor 20 and all the oppositely disposed transmission- and reception-side opposed conductive members 52S and 52J other than the aforesaid reception-side opposed conductive member 52J of the tire monitor device 40. FIG. 8 is a conceptual illustration of the transmission- and reception-side opposed conductive members 52S and 52J subjected to the electric field.

Voltage between the transmission-side opposed conductive member 52S and the tire wheel 15 is switched between the high level and the low level in synchronization with reverse timing of a binary of digital signal delivered by the microcomputer 53M. With the switching, the electric field over the surface of the vehicle-constituting conductor 20 changes such that the potential difference changes between the conductor 20 and all the oppositely disposed transmission- and reception-side opposed conductive members 52S and 52J. Then, the reception circuits 54 of the reception terminals 51B and transmission/reception terminals 51C obtain information from the electric field based on the changes in the potential difference. Based on the identification data contained in the obtained information, the digital signal demodulator 54C of the reception circuit 54 determines whether the obtained information is self-related. Since the information transmitted by the transmission terminal 51A of the tire pressure detector 30 is related only to the reception terminal 51B of the tire monitor device 40, only the information received by the reception terminal 51B is adopted and the information received by the other reception terminals 51B and transmission/reception terminals 51C is ignored (canceled). The microcomputer 40M of the tire monitor device 40 controls the display 40H so that the results of detection of tire pressure and temperature are displayed on the display 40H and/or controls the loud speaker 40S so that a message or alarming sound is produced from the loud speaker.

When the door lock sensor 23 has detected a half-shut state of a door, the transmission/reception terminal 51C connected to the door lock sensor 23 delivers information about half-shut door together with identification data. Only the transmission/reception terminal 51C connected to the main control device 27 responds to the information in the same manner as described above, so that a predetermined warning lamp (not shown) is turned on, for example. When the operation switch 24 is operated, information of operating one of the active components of the wiper motor 21, door lock 22 and head lamps 25 is delivered together with identification data. Only corresponding reception terminal 51B and transmission/reception terminal 51C respond to the information and operate any one of the active components.

In the data communication system 50 of the embodiment, the conductive body 20 but not electric waves is used as a transmission path in order to carry out data communication between two locations which are away from each other in the vehicle-constituting conductor 20. Consequently, radio interference can be suppressed and power consumption can be reduced. Furthermore, since radio waves need not be radiated into the air, data communication can be carried out at a lower frequency than in the conventional system. Furthermore, no transmission line is necessary and troublesome arrangement of the transmission line is avoided. Consequently, the data communication system 50 can easily be installed in the vehicle 10. Furthermore, an in-vehicle LAN can be configured with the vehicle-constituting conductor 20 serving as a bus line among a plurality of transmission terminals 51A, reception terminals 51B and transmission/reception terminals 51C. Still furthermore, bidirectional data communication can be realized by provision of a plurality of transmission/reception terminals 51C. Additionally, since data communication can be carried out at a lower frequency than in the conventional system as described above, output data of the microcomputer 53M can be used as communication data without change in the frequency. Thus, a baseband communication can be realized.

It is preferable that voltage applied between the transmission-side opposed conductive member 52S and the vehicle-constituting conductor 20 has a frequency equal to or lower than 200 MHz. When the frequency is above 200 MHz, electromagnetic wave can be radiated from the conductive member 52S into the air. In particular, the frequency is preferably set at or below 100 MHz in order to avoid failure in communication due to phasing. The reason for this is that wavelength is increased by reducing the frequency, whereupon a reflex size influenced by phasing is increased. More specifically, according to the data communication system 50 of the embodiment, communication can be carried out at the frequency of about 3 MHz. Then, the reflex size influenced by phasing becomes 47 m, which is ten times longer than a vehicle size. As a result, phasing can substantially be eliminated.

Figure 9:
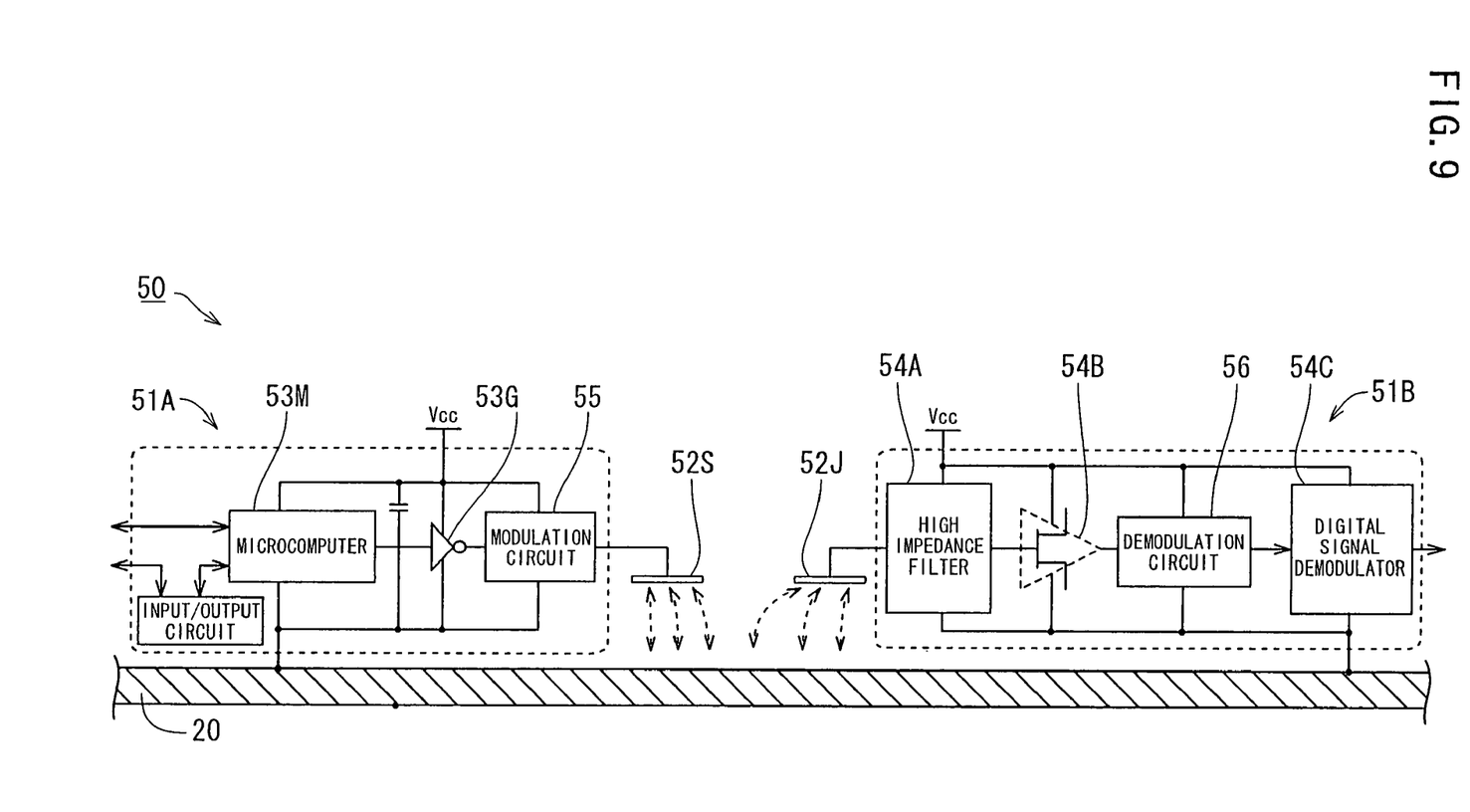
FIG. 9 is an electrical circuit diagram of the data communication system in accordance with a second embodiment of the invention.

FIG. 9 illustrates a second embodiment of the invention. In the second embodiment, a modulation circuit 55 is provided instead of the lowpass filter 53F of the transmission terminal 51A employed in the first embodiment. The modulation circuit 55 carries out pulse modulation, for example, for a carrier wave in a predetermined frequency range according to a digital signal delivered by the microcomputer 53M. The modulation circuit 55 applies an amplitude voltage of the modulated carrier wave between the transmission-side opposed conductive member 52S and the vehicle-constituting conductor 20. Furthermore, the reception terminal 51B includes a demodulation circuit 56 provided between the buffer circuit 54B and the digital signal demodulator 54C. The demodulation circuit 56 obtains, as a carrier wave, a change in the potential difference between the conductor 20 and the reception-side opposed conductive member 52J through the high impedance filter 54A and the buffer circuit 54B, demodulating the carrier wave and supplying the demodulated carrier wave to the digital signal demodulator 54C. The other arrangement of the data communication system of the second embodiment is the same as that of the above-described first embodiment. The second embodiment can accordingly achieve the same effect as the first embodiment.

The transmission terminal 51A and reception terminal 51B of the first embodiment were manufactured as products of the invention. Furthermore, the lowpass filter 53F of the transmission terminal 51A was configured so as to limit a signal the transmission terminal 51A delivers to below maximum frequency of transmission rate, about 6 MHz in the case of 10 Mbps.

Furthermore, a metal plate of 20×10×600 cm was held in an insulated state from the ground and was used as the conductive body (corresponding to the vehicle-constituting conductor 20). The transmission-side opposed conductive member 52S and the reception-side opposed conductive member 52J were opposed to the metal plate by 3 cm from above.

Figure 10:
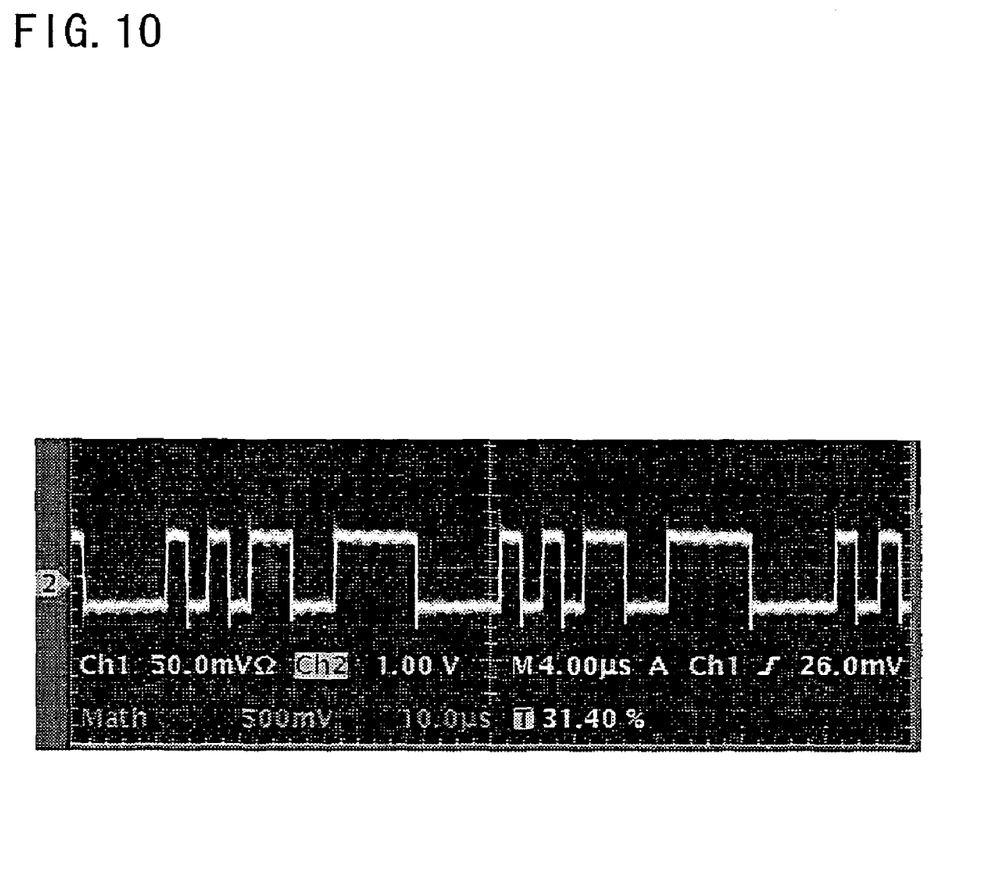
FIG. 10 is a waveform chart of a digital signal the reception terminal transmits based on reception data.

A 2 Mbps serial digital signal delivered by the microcomputer 53M was modulated by the modulation circuit 55 and demodulated by the demodulation circuit 56 by a spread spectrum pulse modulation system between 20 and 70 MHz, so that data communication was carried out between the transmission terminal 51A and the reception terminal 51B. A waveform of the signal delivered by the digital signal demodulator 54C of the reception terminal 51B was examined. FIG. 10 shows the waveform delivered by the demodulator 54C. As shown, the reception circuit 54 could obtain a serial digital signal in which the high level and the low level are distinct from each other.

The invention should not be limited by the above-described embodiments but encompasses the following modified forms. Furthermore, the invention may be practiced without departing from the technical range thereof.

The voltage follower circuit 58 is a source follower circuit comprising the junction FET 57 in the first embodiment. However, the voltage follower circuit 58 may be a source follower circuit comprising a MOSFET or an emitter follower circuit comprising a bipolar transistor (that is, a transistor buffer).

The pulse modulation is carried out in the data communication system 50 of the second embodiment. The modulation may be frequency modulation, amplitude modification, orthogonal modulation, orthogonal frequency multiplexing (OFDM), frequency spread modulation, etc.

In the first embodiment, the transmission terminal 51A applies voltage to the transmission-side opposed conductive member 52S with the vehicle-constituting conductor 20 serving as the circuit GND so that an electric field is generated between the conductor 20 and the conductive member 52S. However, voltage may be applied to the conductor 20 with the transmission terminal 51A serving as the circuit GND, so that an electric field is generated between the conductor 20 and the conductive member 52S.

The transmission- and reception-side opposed conductive members 52S and 52J are respectively a rectangular plate, that is, a flat-plate antenna in the first embodiment. However, the conductive members 52S and 52J may comprise a linear antenna, spiral antenna, stepped antenna or pattern antenna.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A data communication system installed in an electric machine including an electrically conductive body insulated from a ground and having a surface, the system transmitting and receiving information between two different locations in the electric machine, the system comprising:

a transmission terminal and a reception terminal both mounted on the electric machine;

a transmission-side opposed conductive member provided on the transmission terminal so as to be opposed to the conductive body;

a transmission circuit provided on the transmission terminal for applying voltage between the transmission-side opposed conductive member and the conductive body, thereby changing electric field generated on the entire surface of the conductive body, said voltage being changed according to information to be transmitted;

a reception-side opposed conductive member provided on the reception terminal so as to be opposed to the conductive body, thereby generating potential difference according to the electric field between the conductive body and the reception-side opposed conductive member;

a reception circuit provided on the reception terminal for receiving the information based on a change in the potential difference between the conductive body and the reception-side opposed conductive member; and a voltage follower circuit, provided on the reception circuit, constructed and arranged to receive as an input the potential difference between the conductive body and the reception-side opposed conductive member.

2. The system according to claim 1, wherein a plurality of transmission/reception terminals are provided each for serving both as the transmission terminal and as the reception terminal.

3. The system according to claim 1, wherein the transmission circuit processes the information as a digital signal and switches voltage between a high level and a low level according to a binary voltage of the digital signal, said voltage being applied between the transmission-side opposed conductive member and the conductive body, and the reception circuit receives as the digital signal a change in potential difference between the conductive body and the reception-side opposed conductive member.

4. The system according to claim 1, wherein the transmission circuit applies voltage to the transmission-side opposed conductive member with the conductive body serving as an electrical ground to generate an electric field between the transmission-side opposed conductive member and the conductive body.

5. The system according to claim 1, wherein the transmission circuit applies voltage to the conductive body with the transmission-side opposed conductive member serving as an electrical ground to generate an electric field between the transmission-side opposed conductive member and the conductive body.

6. The system according to claim 1, wherein the reception circuit picks up an electric field between the reception-side opposed conductive member and the conductive body with the conductive body serving as an electrical ground.

7. The system according to claim 1, wherein the reception circuit picks up an electric field between the reception-side opposed conductive member and the conductive body with the reception-side opposed conductive member serving as an electrical ground.

8. The system according to claim 1, wherein each of the transmission- and reception-side opposed conductive members comprises a flat-plate antenna, linear antenna, spiral antenna, stepped antenna or pattern antenna.

9. The system according to claim 1, wherein the electric machine is a vehicle and the conductive body is a vehicle-constituting conductor including a chassis, main body, axle shafts and tire wheels and insulated from the ground by tires.

10. The system according to claim 1, wherein the transmission terminal is a tire pressure detector which is mounted on a tire wheel for detecting an internal pressure of a tire, thereby transmitting a result of detection, the transmission-side opposed conductive member is mounted on the transmission terminal so as to be opposed to the tire wheel, the reception terminal is a tire monitor device mounted on a main body for receiving a result of detection of tire internal pressure, and the reception-side opposed conductive member is provided on the reception terminal so as to be opposed to the main body.

* * * * *